United States Patent
Morris

(10) Patent No.: US 11,632,776 B2
(45) Date of Patent: Apr. 18, 2023

(54) TECHNIQUES FOR HANDLING OVERLAPPING TRANSMISSIONS AFTER TIMING ADJUSTMENT

(71) Applicant: QUALCOMM Incorporated, San Diego, CA (US)

(72) Inventor: Anthony Richard Morris, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/466,476

(22) Filed: Sep. 3, 2021

(65) Prior Publication Data

US 2023/0071391 A1 Mar. 9, 2023

(51) Int. Cl.
*H04W 72/12* (2009.01)
*H04W 72/1268* (2023.01)

(52) U.S. Cl.
CPC ... *H04W 72/1268* (2013.01); *H04W 72/1226* (2013.01)

(58) Field of Classification Search
CPC ......... H04W 72/1205; H04W 72/1263; H04W 72/1289; H04W 92/18; H04W 72/1242; H04W 72/1268; H04W 72/12; H04W 72/10; H04L 1/1812; H04L 5/00
See application file for complete search history.

(56) References Cited

U.S. PATENT DOCUMENTS

| 8,467,373 | B2 * | 6/2013 | Ahn ..................... H04L 27/2646 370/503 |
| 10,772,061 | B2 | 9/2020 | Abedini et al. |
| 2012/0257519 | A1 * | 10/2012 | Frank .................... H04W 72/02 370/252 |
| 2013/0188582 | A1 * | 7/2013 | Dinan .................. H04W 52/04 370/329 |

(Continued)

FOREIGN PATENT DOCUMENTS

| EP | 2904837 B1 * | 1/2019 | ............... G01S 5/00 |
| EP | 3525523 A1 * | 8/2019 | ........ H04W 52/0216 |

(Continued)

OTHER PUBLICATIONS

International Search Report and Written Opinion—PCT/US2022/075357—ISA/EPO—dated Dec. 2, 2022.

(Continued)

*Primary Examiner* — Nathan S Taylor
(74) *Attorney, Agent, or Firm* — Arent Fox, LLP

(57) ABSTRACT

Aspects described herein relate to receiving a timing adjustment (TA) command indicating to adjust timing for an uplink transmission in a time division, adjusting, by the UE and based on the TA command, the timing for the uplink transmission in the time division, and where the uplink transmission includes an overlapping portion that at least partially overlaps in time with a previous uplink transmission scheduled for transmission in a previous time division, due to the TA command, and a non-overlapping portion that does not at least partially overlap in time with the previous (Continued)

uplink transmission, refraining from transmitting the non-overlapping portion of the uplink transmission that is scheduled in the time division. Other aspects relate to transmitting the TA command and not receiving an overlapping uplink transmission.

30 Claims, 7 Drawing Sheets

(56) References Cited

U.S. PATENT DOCUMENTS

| | | | |
|---|---|---|---|
| 2014/0086161 A1* | 3/2014 | Cai | H04W 72/042 370/329 |
| 2014/0086219 A1* | 3/2014 | Suzuki | H04W 56/0005 370/336 |
| 2015/0133137 A1* | 5/2015 | Lee | H04W 72/0486 455/452.1 |
| 2015/0237626 A1 | 8/2015 | Li et al. | |
| 2015/0304891 A1* | 10/2015 | Dinan | H04W 56/0015 370/331 |
| 2016/0014753 A1* | 1/2016 | Wu | H04L 1/1812 370/280 |
| 2016/0219443 A1* | 7/2016 | Lee | H04W 24/02 |
| 2016/0219612 A1* | 7/2016 | Seo | H04W 72/1215 |
| 2017/0230928 A1* | 8/2017 | Basu Mallick | H04W 56/0045 |
| 2017/0332332 A1* | 11/2017 | Zhang | H04W 52/346 |
| 2018/0084546 A1* | 3/2018 | Guo | H04W 72/1268 |
| 2018/0124724 A1* | 5/2018 | Tsai | H04W 74/0833 |
| 2018/0176905 A1* | 6/2018 | Li | H04W 72/044 |
| 2018/0331800 A1 | 11/2018 | Gao et al. | |
| 2019/0261359 A1* | 8/2019 | Wang | H04W 72/0413 |
| 2020/0053752 A1* | 2/2020 | Huang | H04W 72/1268 |
| 2020/0120458 A1* | 4/2020 | Aldana | H04W 4/80 |
| 2020/0314788 A1* | 10/2020 | Yu | H04W 56/0065 |
| 2020/0322108 A1 | 10/2020 | Liu et al. | |
| 2021/0105732 A1* | 4/2021 | Takeda | H04W 56/0045 |
| 2021/0111835 A1* | 4/2021 | Khoshnevisan | H04W 72/02 |
| 2021/0168735 A1* | 6/2021 | Liu | H04W 52/365 |
| 2021/0235476 A1* | 7/2021 | Luo | H04W 72/1278 |
| 2021/0345323 A1* | 11/2021 | Axmon | H04W 72/12 |
| 2022/0159729 A1* | 5/2022 | Xiong | H04W 72/1268 |
| 2022/0279453 A1* | 9/2022 | Dinan | H04L 5/001 |
| 2022/0377675 A1* | 11/2022 | Dinan | H04W 52/367 |

FOREIGN PATENT DOCUMENTS

| | | | | |
|---|---|---|---|---|
| EP | 3668239 A1 | 6/2020 | | |
| WO | WO-2019081020 A1 * | 5/2019 | | H04B 7/0617 |
| WO | 2020064698 A1 | 4/2020 | | |
| WO | 2020206099 A1 | 10/2020 | | |
| WO | WO-2020251734 A1 * | 12/2020 | | H04W 56/0005 |

OTHER PUBLICATIONS

Vivo: "UL Inter-UE Tx Prioritization for URLLC", R1-1810396, 3GPP TSG RAN WG1 Meeting #94bis, UL Inter UE Tx Prioritization For URLLC, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, XP051517805, Section 2, 10 Pages.

* cited by examiner

TECHNIQUES FOR HANDLING OVERLAPPING TRANSMISSIONS AFTER TIMING ADJUSTMENT

BACKGROUND

Aspects of the present disclosure relate generally to wireless communication systems, and more particularly, to transmitting communications after applying timing adjustment.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as fourth generation (4G) long term evolution (LTE), 5G NR, etc., a user equipment (UE) can be configured with a timing adjustment (TA) to apply in transmitting uplink communications to more closely align the timing of transmissions to a timing at the base station receiving the transmissions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to receive a timing adjustment (TA) command indicating to adjust timing for an uplink transmission in a time division, adjust, based on the TA command, the timing for the uplink transmission in the time division, and where the uplink transmission includes an overlapping portion that at least partially overlaps in time with a previous uplink transmission scheduled for transmission in a previous time division, due to the TA command, and a non-overlapping portion that does not at least partially overlap in time with the previous uplink transmission, refrain from transmitting the non-overlapping portion of the uplink transmission that is scheduled in the time division.

In another aspect, an apparatus for wireless communication is provided that includes a transceiver, a memory configured to store instructions, and one or more processors communicatively coupled with the memory and the transceiver. The one or more processors are configured to execute the instructions to cause the apparatus to transmit a TA command indicating to adjust timing for an uplink transmission by a user equipment (UE), in a time division, and receive, from the UE and based on applying the TA command, a first uplink transmission in a first time division and a third uplink transmission in a third time division without receiving at least a non-overlapping portion of a second uplink transmission in a second time division that precedes the third time division in time and at least partially overlaps the first time division in time.

In another aspect, a method for wireless communication at a UE is provided that includes receiving, by the UE, a TA command indicating to adjust timing for an uplink transmission in a time division, adjusting, by the UE and based on the TA command, the timing for the uplink transmission in the time division, and where the uplink transmission includes an overlapping portion that at least partially overlaps in time with a previous uplink transmission scheduled for transmission in a previous time division, due to the TA command, and a non-overlapping portion that does not at least partially overlaps in time with the previous uplink transmission, refraining from transmitting the non-overlapping portion of the uplink transmission that is scheduled in the time division.

In another aspect, a method for wireless communication at a base station is provided that includes transmitting, by the base station, a TA command indicating to adjust timing for an uplink transmission, by a UE, in a time division, and receiving, from the UE and based on applying the TA command, a first uplink transmission in a first time division and a third uplink transmission in a third time division without receiving at least a non-overlapping portion of a second uplink transmission in a second time division that precedes the third time division in time and at least partially overlaps the first time division in time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
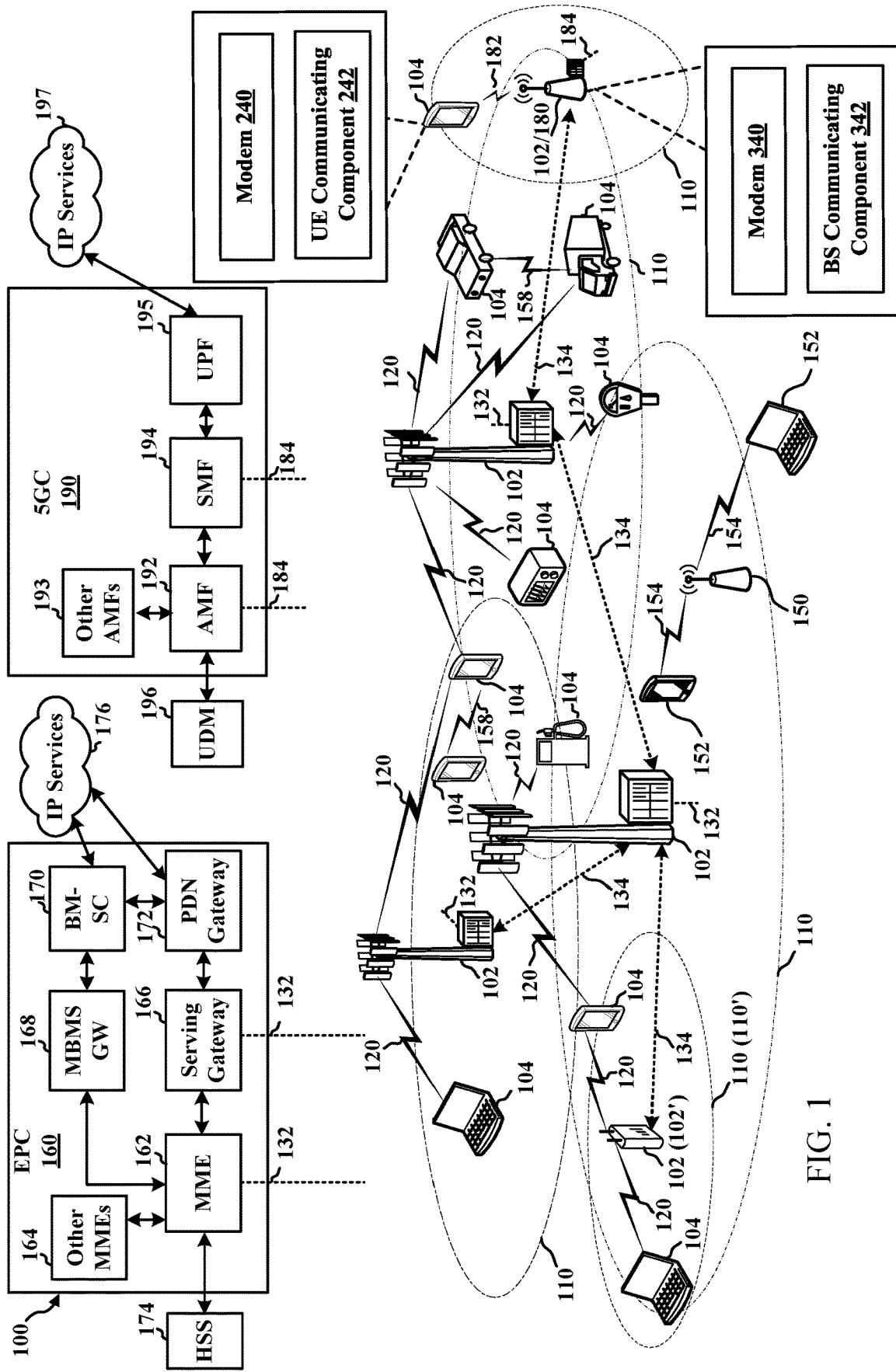
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to handling transmissions that are scheduled to occur in time divisions that at least partially overlap in time. For example, in some wireless communication technologies, including third generation partnership project (3GPP) technologies such as fourth generation (4G) long term evolution (LTE), fifth generation (5G) new radio (NR), etc., a device that transmit communications may be instructed to apply a timing advance (TA) for transmitting communications to more closely align time with a receiving device. In one example, a base station can transmit a TA to a user equipment (UE) that indicates a value for the UE to apply in adjusting timing for transmitting uplink communications. When the UE applies the TA, uplink transmissions in adjacent time divisions may at least partially overlap in time.

In some wireless communication technologies, a time division may include a transmission time interval (TTI), which may be or include a subframe of a fixed duration in time (e.g., 1 millisecond) that includes a number of symbols (e.g., orthogonal frequency division multiplexing (OFDM) symbols, single carrier-frequency division multiplexing (SC-FDM) symbols, etc.), a slot of a varying or fixed number of symbols, a symbol or collection of multiple symbols, etc. In this regard, in one example, where the time division is a subframe and based on the UE apply the TA, an uplink transmission scheduled for transmission in a subframe after the TA is applied may at least partially overlap, in time, a previous uplink transmission being transmitted in a previous subframe before the TA was applied. The UE may not transmit at least the portion of the uplink transmission that overlaps the previous uplink transmission.

In accordance with aspects described herein, the UE may also refrain from transmitting the uplink transmission altogether, such that the UE can refrain from transmitting both the portion of the uplink transmission that overlaps the previous uplink transmission and the remainder of the uplink transmission scheduled in the time division after applying the TA. In one example, the UE can refrain from transmitting the uplink transmission based on other factors as well, such as a channel quality or signal measurements performed on signals received from the base station. For example, increasing TA, which can lead to the overlap, can occur as the UE moves farther away from the base station (or otherwise experiences degradation in cell coverage). As such, it may be beneficial to drop the uplink transmission in the subframe altogether. In any case, the UE can avoid transmitting overlapping uplink transmissions, which can improved the quality of communications, conserve communication resources, and accordingly improve user experience when using the UE.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for refraining from transmitting uplink transmissions that overlap with previous uplink transmissions as a result of applying a TA, in accordance with aspects described herein. In addition, some nodes may have a modem 340 and BS communicating component 342 for receiving uplink transmissions from a UE that may include not receiving uplink transmissions that overlap with previous uplink transmissions as a result of applying a TA, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an Si interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can apply a TA for transmitting uplink transmissions. In one example, BS communicating component 342 can transmit a TA command to the UE 104 to cause application of the TA for transmitting uplink transmissions. Where applying the TA command results in an uplink transmission scheduled after applying the TA command at least partially overlapping a previous uplink transmission in time (e.g., where the corresponding time divisions overlap in time), UE communicating component 242 can refrain from transmitting the uplink transmission that is scheduled after applying the TA command (e.g., in a time division adjusted based on applying the TA command). For example, UE communicating component 242 can refrain from transmitting an overlapping portion of the uplink transmission that overlaps the previous uplink transmission and can also refrain from transmitting a remaining portion of the uplink transmission that is scheduled in the time division and does not overlap the previous uplink transmission in time.

Figure 2:
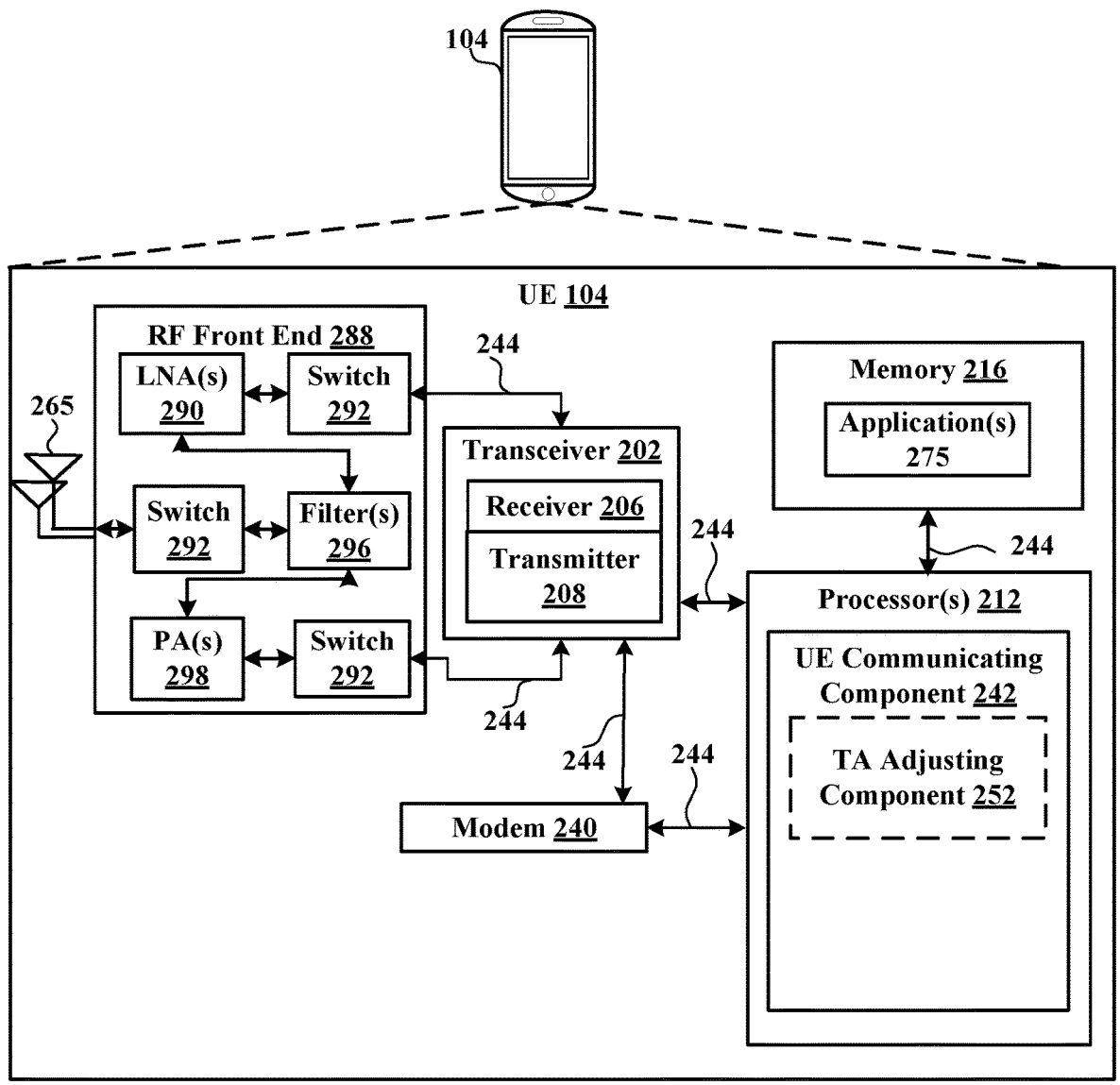
FIG. 2 is a block diagram illustrating an example of a UE, in accordance with various aspects of the present disclosure.
Figure 3:
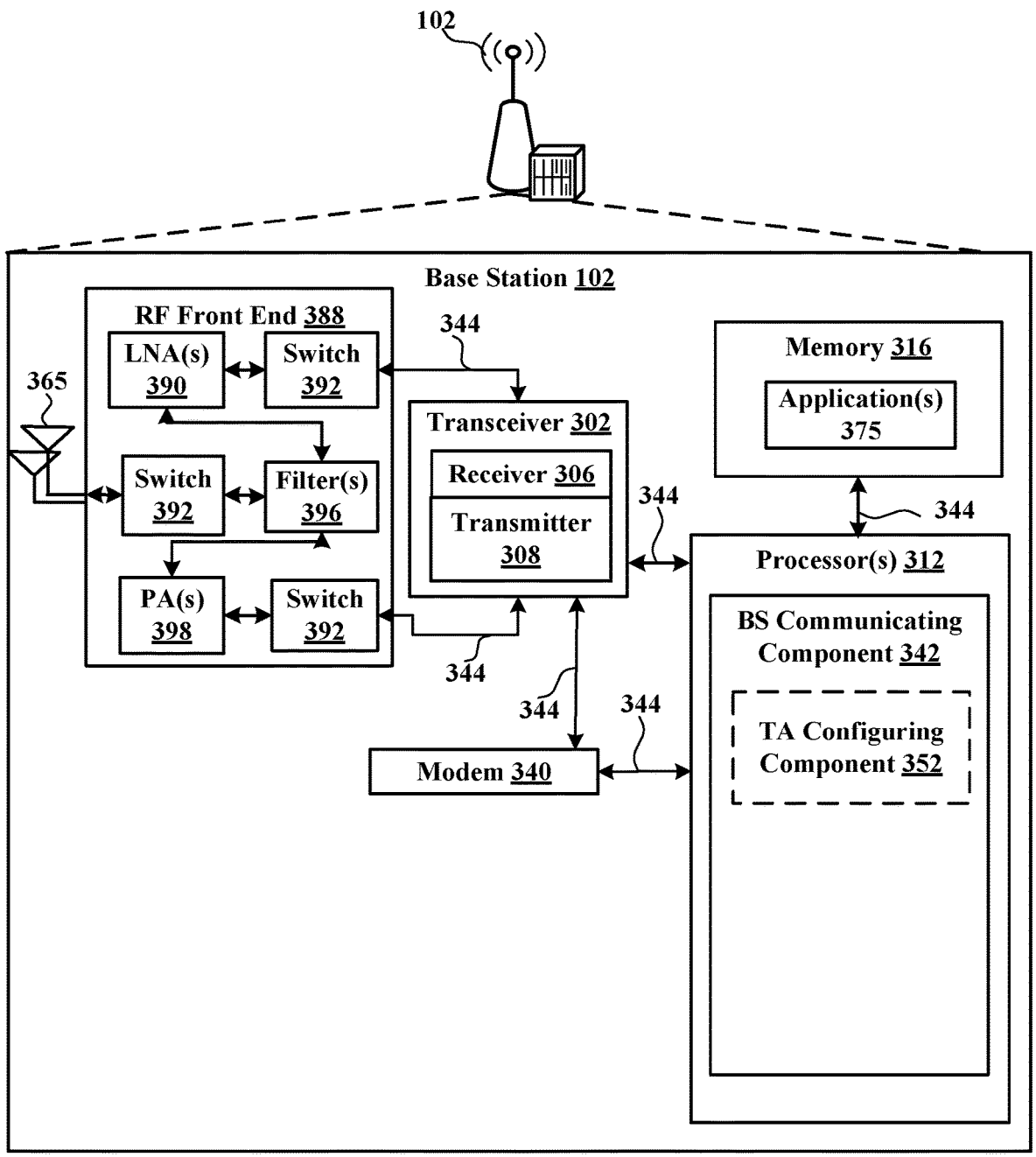
FIG. 3 is a block diagram illustrating an example of a base station, in accordance with various aspects of the present disclosure.
Figure 4:
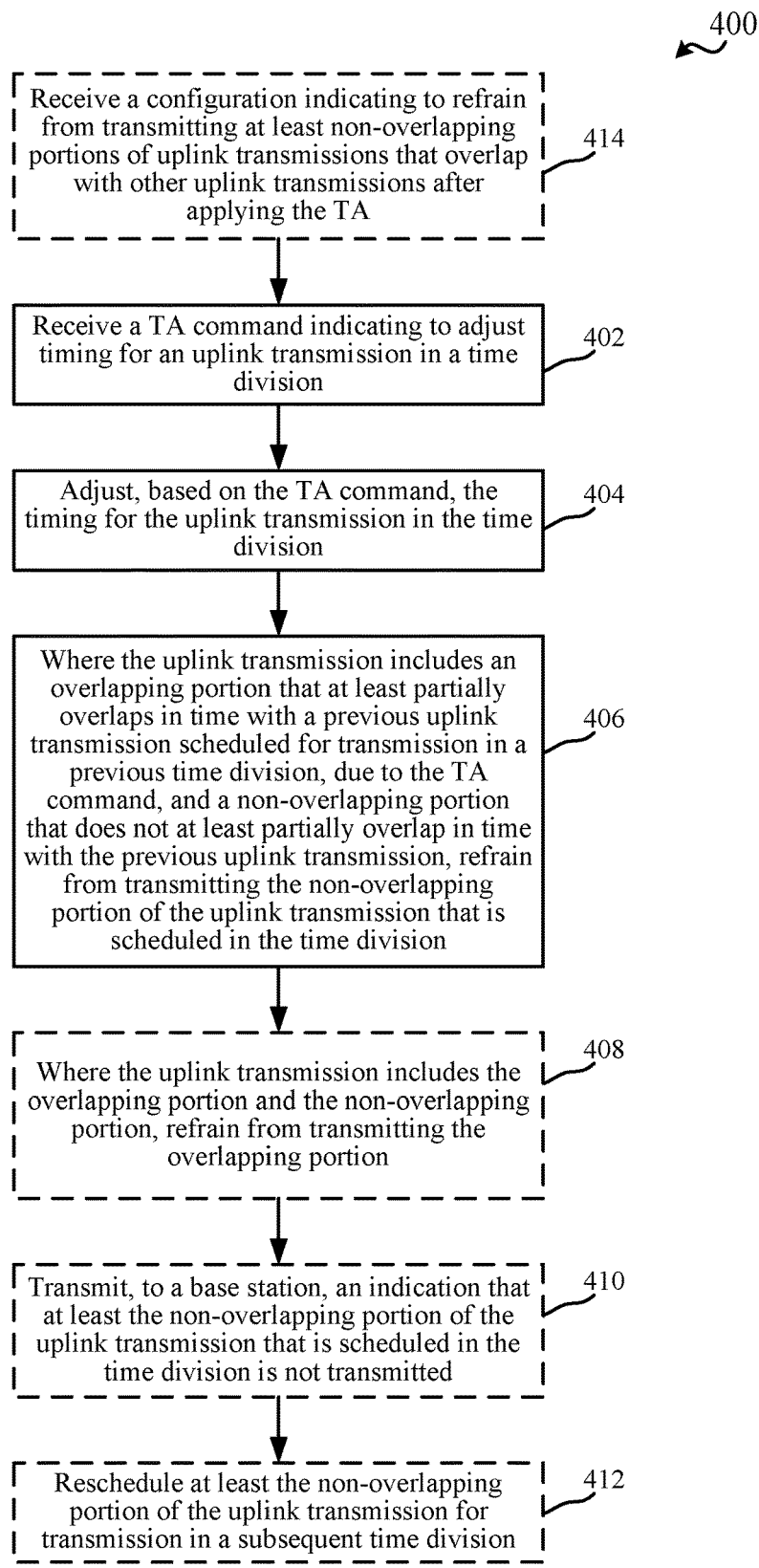
FIG. 4 is a flow chart illustrating an example of a method for refraining from transmitting uplink transmissions that overlap with previous uplink transmissions as a result of applying a timing advance (TA), in accordance with aspects described herein.
Figure 5:
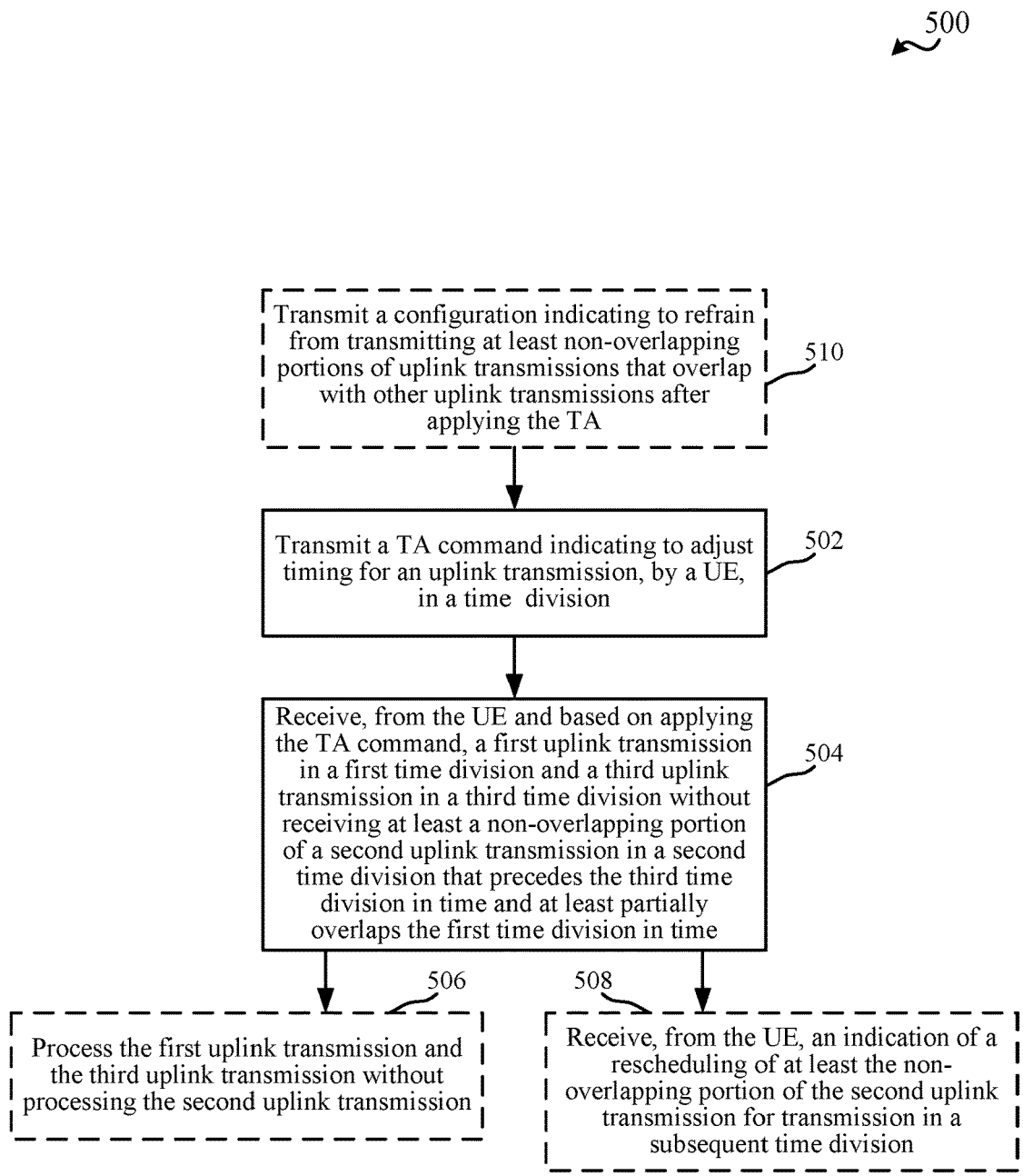
FIG. 5 is a flow chart illustrating an example of a method for receiving uplink transmissions from a UE that may include not receiving uplink transmissions that overlap with previous uplink transmissions as a result of applying a TA, in accordance with aspects described herein.

Turning now to FIGS. 2-7, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for refraining from transmitting uplink transmissions that overlap with previous uplink transmissions as a result of applying a TA, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a TA adjusting component 252 for adjusting a TA for transmitting uplink communications, in accordance with aspects described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for receiving uplink transmissions from a UE that may include not receiving uplink transmissions that overlap with previous uplink transmissions as a result of applying a TA, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a TA configuring component 352 for configuring a TA command for a UE to apply in transmitting uplink transmissions, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for refraining from transmitting uplink transmissions that overlap with previous uplink transmissions as a result of applying a TA, in accordance with aspects described herein. In an example, a UE 104 can perform the functions described in method 400 using one or more of the components described in FIGS. 1 and 2.

In method 400, at Block 402, the UE can receive a TA command indicating to adjust timing for an uplink transmission in a time division. In an aspect, TA adjusting component 252, e.g., in conjunction with processor(s) 212, memory 216, transceiver 202, UE communicating component 242, etc., can receive the TA command indicating to adjust timing for the uplink transmission in the time division. For example, TA adjusting component 252 can receive the TA command from a base station (e.g., base station 102) communicating in a wireless network. In this example, the base station 102 can transmit the TA command to the UE 104 in downlink control information (DCI) signaling over a physical downlink control channel (PDCCH) or physical downlink shared channel (PDSCH), higher layer signaling, such as radio resource control (RRC) signaling, media access control (MAC) control element (CE), and/or the like, and as such, TA adjusting component 252 can receive the TA command in DCI signaling, RRC signaling, MAC-CE, etc.

In an example, the TA command may indicate a TA to apply to a current uplink transmission timing used by the UE 104 in transmitting uplink transmissions to more closely align timing of the uplink transmissions for reception at a certain time by the base station 102. For example, where the time division is a subframe, the TA command may indicate a TA that the UE 104 is to apply to more closely align a subframe boundary at the UE 104 when transmitting the uplink transmission to a subframe boundary at the base station 102 when receiving the uplink transmission. The UE 104 can be expected to apply the TA, as instructed by the base station 102.

In method 400, at Block 404, the UE can adjust, based on the TA command, the timing for the uplink transmission in the time division. In an aspect, TA adjusting component 252, e.g., in conjunction with processor(s) 212, memory 216, transceiver 202, UE communicating component 242, etc., can adjust, based on the TA command, the timing for the uplink transmission in the time division. For example, TA adjusting component 252 can apply the TA at a scheduler of the UE 104 that schedules the uplink transmissions (e.g., at a physical (PHY) layer or MAC layer) so that the scheduler can modify timing of the uplink transmissions based on the TA. As described, for example, where the time division is a subframe, the scheduler can align subframes for uplink transmissions based on the TA value to move the subframe boundary to a time sooner or later than the current time based on the TA value.

As described, adjusting the timing for transmitting uplink transmissions may result in uplink transmissions in consecutive subframes overlapping, at least partially, in time. For example, an uplink transmission scheduled in a first subframe after applying the TA may overlap a previous uplink transmission transmitted in a previous subframe before applying the TA (e.g., where the TA indicates to increase the advance at which the UE 104 schedules uplink transmissions). An example is shown in FIG. 6.

Figure 6:
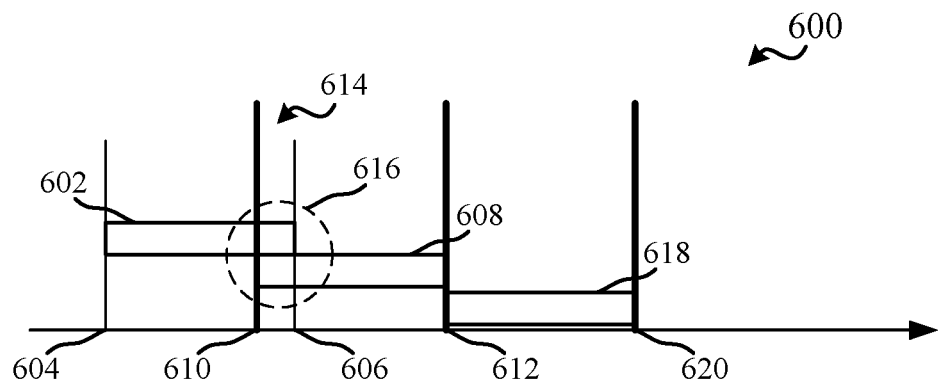
FIG. 6 illustrates an example of a resource allocation at least over time resources, in accordance with aspects described herein.

FIG. 6 illustrates an example of a resource allocation 600 at least over time resources (e.g., subframes, slots, symbols, etc.). Resource allocation 600 includes a first uplink transmission 602 transmitted in a first time division defined as having a start time 604 and end time 606, and a second uplink transmission 608 scheduled in a second time division defined as having a start time 610 and end time 612. The first and second time divisions may have the same duration (e.g., each be a subframe, a slot, or a symbol defined with the same duration), but may be offset due to a TA command applied before the start of the second time division. Though the first uplink transmission 602 and the second uplink transmission 608 are shown on different vertical planes in FIG. 6, this is not necessarily representative of different frequency resources, rather the first uplink transmission 602 and the second uplink transmission 608 are shown in this regard to more easily observe the overlap and the distinct uplink transmissions.

In resource allocation 600, application of the TA command can result in a scheduler of the UE 104 moving the time division back by an offset 614. This offset 614 between the second time division during which the second uplink transmission 608 is scheduled and the first time division during which the first uplink transmission 602 is transmitted can result in potential overlap 616 between the transmissions. As described in further detail herein, where the overlap 616 occurs, the UE 104 can refrain from transmitting the second uplink transmission 608, including refraining from transmitting the overlapping portion of the second uplink transmission 608 shown at 616 and the remaining portion of the second uplink transmission 608 between the end time 606 of the first time division and the end time 612 of the second time division. In an example, the UE 104 can then continue transmitting a third uplink transmission 618 in a third time division that is based on the TA command being applied and has a start time 612 and end time 620. As described, the uplink transmissions in FIG. 6 and described herein may include one or more of physical uplink control channel (PUCCH) transmissions, physical uplink shared channel (PUSCH) transmissions, and/or sounding reference signal (SRS) transmissions.

In method 400, at Block 406, the UE can, where the uplink transmission includes an overlapping portion that at least partially overlaps in time with a previous uplink transmission scheduled for transmission in a previous time division, due to the TA command, and a non-overlapping portion that does not at least partially overlaps in time with the previous uplink transmission, refrain from transmitting the non-overlapping portion of the uplink transmission that is scheduled in the time division. In an aspect, UE communicating component 242, e.g., in conjunction with processor(s) 212, memory 216, transceiver 202, etc., can, where the uplink transmission includes an overlapping portion that at least partially overlaps in time with the previous uplink transmission scheduled for transmission in the previous time division, due to the TA command, and a non-overlapping portion that does not at least partially overlaps in time with the previous uplink transmission, refrain from transmitting the non-overlapping portion of the uplink transmission that is scheduled in the time division. For example, referring to FIG. 6, UE communicating component 242 can refrain from transmitting at least the portion of the second uplink transmission 608 (e.g., the non-overlapping portion) between the end time 606 of the first time division and the end time 612 of the second time division.

In an example, UE communicating component 242 can refrain from transmitting at least this non-overlapping portion of the uplink transmission based on detecting the overlap or otherwise determining that applying the TA results in the overlap. For example, UE communicating component 242 can refrain from transmitting at least this non-overlapping portion of the uplink transmission in the time division after the TA is applied based on determining that the TA command increases the TA to be applied to uplink transmissions. For example, as this uplink transmission is scheduled to overlap the previous uplink transmission, refraining from transmitting this uplink transmission may avoid the overlap, and refraining from transmitting even the non-overlapping portion of the uplink transmission may avoid unnecessary transmission in the case of overlap. For example, if the overlapped portion of the uplink transmission is not transmitted due to the overlap, it may be beneficial to also skip the rest of the uplink transmission for the remainder of the TA-adjusted time division.

In another example, UE communicating component 242 can refrain from transmitting at least the non-overlapping portion of the uplink transmission based on other considerations as well, such as signal metrics of one or more signals received from the base station 102. For example, where signals received from the base station 102 are not at least a threshold level, UE communicating component 242 can determine to refrain from transmitting at least the non-overlapping portion of the uplink transmission as transmission thereof is not as likely to succeed. For example, the signal metrics may include a received signal strength indicator (RSSI), reference signal received power (RSRP), reference signal received quality (RSRQ), signal-to-noise ratio (SNR), etc.

In method 400, optionally at Block 408, the UE can, where the uplink transmission includes the overlapping portion and the non-overlapping portion, refrain from transmitting the overlapping portion. In an aspect, UE communicating component 242, e.g., in conjunction with processor(s) 212, memory 216, transceiver 202, etc., can, where the uplink transmission includes the overlapping portion and the non-overlapping portion, refrain from transmitting the overlapping portion. For example, referring to FIG. 6, UE communicating component 242 can refrain from transmitting at least the overlapping portion of the second uplink transmission 608 shown at 616. Thus, in an example in the case of overlapping uplink transmissions, UE communicating component 242 can refrain from transmitting the entire second uplink transmission 608, both the overlapping portion shown at 616 and the remaining portion between the end time 606 of the first time division and the end time 612 of the second time division.

In method 400, optionally at Block 410, the UE can transmit, to a base station, an indication that at least the non-overlapping portion of the uplink transmission that is scheduled in the time division is not transmitted. In an aspect, UE communicating component 242, e.g., in conjunction with processor(s) 212, memory 216, transceiver 202, etc., can transmit, to the base station (e.g., base station 102), the indication that at least the non-overlapping portion of the uplink transmission that is scheduled in the time division is not transmitted. For example, UE communicating component 242 can transmit the indication prior or subsequent to the time division during which the uplink transmission not being transmitted was scheduled. In an example, UE communicating component 242 can transmit the indication in an uplink transmission (e.g., PUCCH, PUSCH, SRS transmission, etc.) in a subsequent time division as a parameter value, using an encoding or resource selection for the uplink transmission, etc. For example, such indication may assist the base station 102 in determining that the uplink transmission, or at least the non-overlapping portion thereof, was dropped and will not be received, which can improve decoding performance at the base station 102.

In method 400, optionally at Block 412, the UE can reschedule at least the non-overlapping portion of the uplink transmission for transmission in a subsequent time division. In an aspect, UE communicating component 242, e.g., in conjunction with processor(s) 212, memory 216, transceiver 202, etc., can reschedule at least the non-overlapping portion of the uplink transmission for transmission in the subsequent time division. For example, UE communicating component 242 can reschedule at least the non-overlapping portion of the uplink transmission (e.g., or all of the uplink transmission that was not transmitted due to the overlap) in the subsequent time division (e.g., in a next subframe, slot, symbol, etc.). Moreover, UE communicating component 242 can determine whether to reschedule at least the non-overlapping portion of the uplink transmission based on one or more parameters associated therewith. For example, UE communicating component 242 can determine to reschedule uplink transmissions that are of a certain type (e.g., reschedule PUCCH but not PUSCH transmissions), uplink transmissions that are of a certain quality-of-service (QoS), etc. In one example, the base station 102 can configure the UE 104 with an indication of which uplink transmissions to reschedule.

In method 400, optionally at Block 414, the UE can receive a configuration indicating to refrain from transmitting at least non-overlapping portions of uplink transmissions that overlap with other uplink transmissions after applying the TA. In an aspect, UE communicating component 242, e.g., in conjunction with processor(s) 212, memory 216, transceiver 202, etc., can receive the configuration indicating to refrain from transmitting at least non-overlapping portions (and/or the overlapping portion or otherwise the entirety) of uplink transmissions that overlap with other uplink transmissions after applying the TA. In this example, UE communicating component 242 can refrain from transmitting at least the portion of the uplink transmission and/or the overlapping portion based on receiving the configuration from the base station 102 and where overlap occurs, as described above.

FIG. 5 illustrates a flow chart of an example of a method 500 for receiving uplink transmissions from a UE that may include not receiving uplink transmissions that overlap with previous uplink transmissions as a result of applying a TA, in accordance with aspects described herein. In an example, a base station 102 can perform the functions described in method 500 using one or more of the components described in FIGS. 1 and 3.

In method 500, at Block 502, the base station can transmit a TA command indicating to adjust timing for an uplink transmission, by a UE, in a time division. In an aspect, TA configuring component 352, e.g., in conjunction with processor(s) 312, memory 316, transceiver 302, BS communicating component 342, etc., can transmit the TA command indicating to adjust timing for the uplink transmission, by the UE, in the time division. For example, TA configuring component 352 can transmit the TA command to the UE (e.g., UE 104) in DCI signaling, RRC signaling, MAC-CE, etc., as described. In an example, TA configuring component 352 can generate the TA command to indicate a TA to apply to a current uplink transmission timing used by the UE 104 in transmitting uplink transmissions to more closely align timing of the uplink transmissions for reception at a certain time by the base station 102, as described.

In method 500, at Block 504, the base station can receive, from the UE and based on applying the TA command, a first uplink transmission in a first time division and a third uplink transmission in a third time division without receiving at least a non-overlapping portion of a second uplink transmission in a second time division that precedes the third time division in time and at least partially overlaps the first time division in time. In an aspect, BS communicating component 342, e.g., in conjunction with processor(s) 312, memory 316, transceiver 302, etc., can receive, from the UE and based on applying the TA command, the first uplink transmission in the first time division and the third uplink transmission in the third time division without receiving at least the non-overlapping portion of the second uplink transmission in the second time division, where the second uplink transmission precedes the third time division in time and at least partially overlaps the first time division, and/or the associated first uplink transmission, in time. For example, referring to FIG. 6, BS communicating component 342, based on transmitting the TA command, may receive the first uplink transmission 602 and the third uplink transmission 618, without receiving the second uplink transmission 608 due to overlap 616 when applying the TA command, as described above.

In method 500, optionally at Block 506, the base station can process the first uplink transmission and the third uplink transmission without processing the second uplink transmission. In an aspect, BS communicating component 342, e.g., in conjunction with processor(s) 312, memory 316, transceiver 302, etc., can process the first uplink transmission and the third uplink transmission without processing the second uplink transmission. For example, BS communicating component 342 can combine the first uplink transmission and the third uplink transmission for decoding communications received from the UE 104. In one example, BS communicating component 342 may receive an indication from the UE 104 that the second uplink transmission is not transmitted, and can process the uplink transmissions without the second uplink transmission based on such an indication. In one example, BS communicating component 342 may determine that the second uplink transmission is not transmitted by the UE 104 based on determining that the TA command increased the TA for the UE 104 and/or based on determining a time division for which the UE 104 is to apply the TA.

In method 500, optionally at Block 508, the base station can receive, from the UE, an indication of a rescheduling of at least the non-overlapping portion of the second uplink transmission for transmission in a subsequent time division. In an aspect, BS communicating component 342, e.g., in conjunction with processor(s) 312, memory 316, transceiver 302, etc., can receive, from the UE (e.g., UE 104), the indication of the rescheduling of at least the non-overlapping portion (and/or the overlapping portion or otherwise the entirety) of the second uplink transmission for transmission in the subsequent time division. In this example, BS communicating component 342 can receive the second uplink transmission in the subsequent time division, and can accordingly process the uplink transmissions to include the second uplink transmission. In an example, as described, BS communicating component 342 can receive the indication from the UE 104 in a PUCCH, PUSCH, etc. communication, RRC signaling, MAC-CE, etc., or one or more parameters of uplink transmission, such as an encoding or frequency resource selection, etc. BS communicating component 342 can accordingly determine the rescheduled time division and can receive the second uplink transmission during the rescheduled time division.

In method 500, optionally at Block 510, the base station can transmit a configuration indicating to refrain from transmitting at least non-overlapping portions of uplink transmissions that overlap with other uplink transmissions after applying the TA. In an aspect, BS communicating component 342, e.g., in conjunction with processor(s) 312, memory 316, transceiver 302, etc., can transmit, to the UE (e.g., UE 104) the configuration indicating to refrain from transmitting at least non-overlapping portions (and/or the overlapping portion or otherwise the entirety) of uplink transmissions that overlap with other uplink transmissions after applying the TA. In this example, the UE 104 can refrain from transmitting at least the non-overlapping portion of the uplink transmission and/or the overlapping portion based on receiving the configuration. In addition, in an example, the base station 102 may determine that the UE 104 will not transmit the second uplink transmission based on the configuration.

Figure 7:
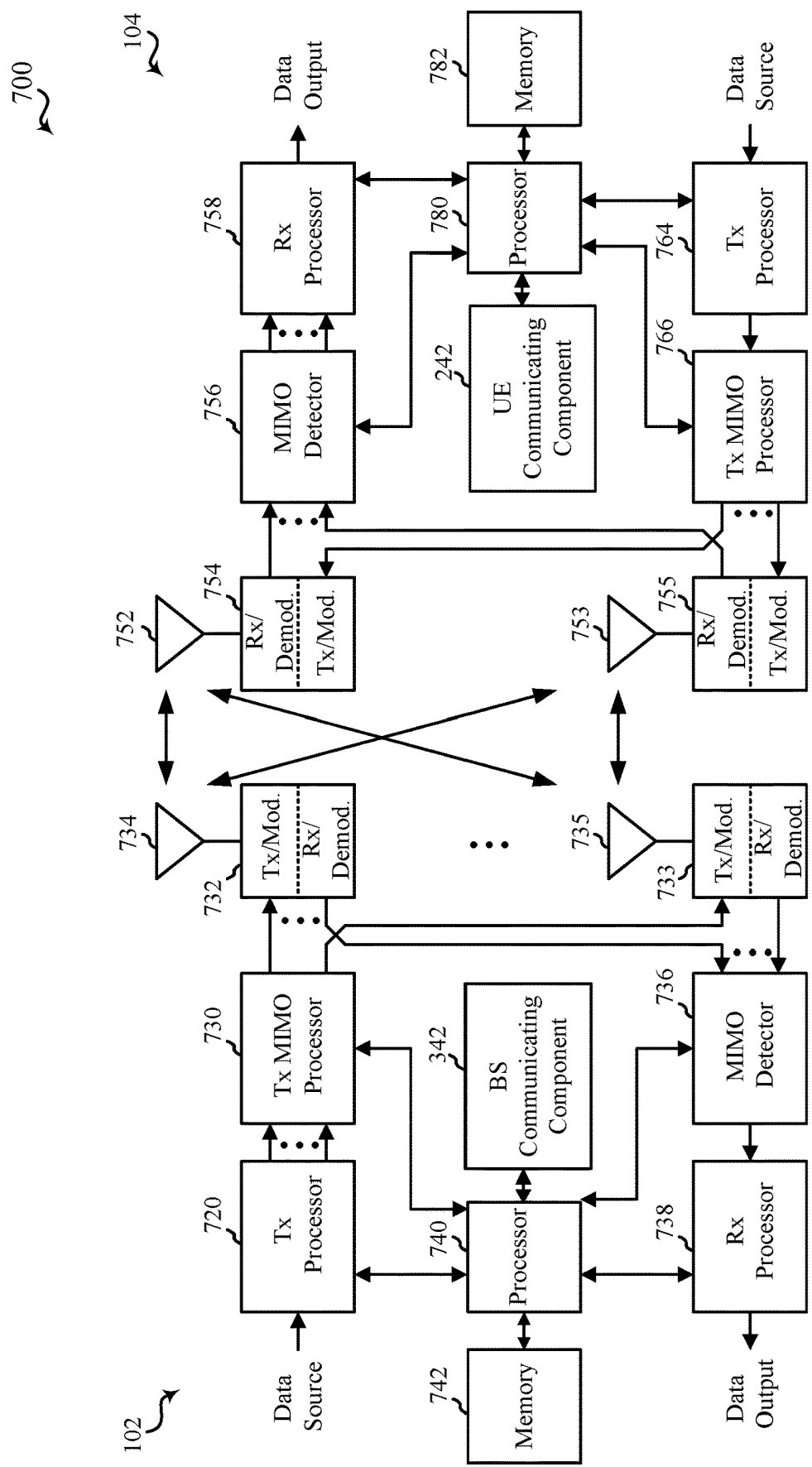
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a UE communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communications by a UE including receiving, by the UE, a TA command indicating to adjust timing for an uplink transmission in a time division, adjusting, by the UE and based on the TA command, the timing for the uplink transmission in the time division, and where the uplink transmission includes an overlapping portion that at least partially overlaps in time with a previous uplink transmission scheduled for transmission in a previous time division, due to the TA command, and a non-overlapping portion that does not at least partially overlap in time with the previous uplink transmission, refraining from transmitting the non-overlapping portion of the uplink transmission that is scheduled in the time division.

In Aspect 2, the method of Aspect 1 includes refraining from transmitting at least the overlapping portion of the uplink transmission.

In Aspect 3, the method of any of Aspects 1 or 2 includes where the time division includes one of a subframe, a slot of multiple symbols, or a symbol.

In Aspect 4, the method of any of Aspects 1 to 3 includes where the uplink transmission is one of a PUCCH transmission, a PUSCH transmission, or a SRS.

In Aspect 5, the method of any of Aspects 1 to 4 includes rescheduling at least the non-overlapping portion of the uplink transmission for transmission in a subsequent time division.

In Aspect 6, the method of Aspect 5 includes where rescheduling at least the non-overlapping portion of the uplink transmission is based at least in part on a type of the uplink transmission.

In Aspect 7, the method of any of Aspects 5 or 6 include where rescheduling at least the non-overlapping portion of the uplink transmission is based at least in part on a QoS associated with the uplink transmission.

In Aspect 8, the method of any of Aspects 1 to 7 includes where refraining from transmitting at least the non-overlapping portion of the uplink transmission is based at least in part on one or more signal metrics measured from one or more signals received from a base station.

In Aspect 9, the method of any of Aspects 1 to 8 includes receiving, from a base station, a configuration indicating to refrain from transmitting at least the non-overlapping portion of the uplink transmission after applying the TA.

In Aspect 10, the method of any of Aspects 1 to 9 includes transmitting, to a base station, an indication that at least the non-overlapping portion of the uplink transmission that is scheduled in the time division is not transmitted.

Aspect 11 is a method for wireless communications by a base station including transmitting, by the base station, a TA command indicating to adjust timing for an uplink transmission, by a UE, in a time division, and receiving, from the UE and based on applying the TA command, a first uplink transmission in a first time division and a third uplink transmission in a third time division without receiving at least a non-overlapping portion of a second uplink transmission in a second time division that precedes the third time division in time and at least partially overlaps the first time division in time.

In Aspect 12, the method of Aspect 11 includes where receiving the first uplink transmission and the third uplink transmission is also without receiving an overlapping portion of the second uplink transmission that overlaps the first time division in time.

In Aspect 13, the method of any of Aspects 11 or 12 includes where the first time division, the second time division, and the third time division include one of a subframe, a slot of multiple symbols, or a symbol.

In Aspect 14, the method of any of Aspects 11 to 13 includes where the first uplink transmission, the second uplink transmission, and the third uplink transmission are one of a PUCCH transmission, a PUSCH transmission, or a SRS.

In Aspect 15, the method of any of Aspects 11 to 14 includes receiving, from the UE, an indication of a rescheduling of at least the non-overlapping portion of the second uplink transmission for transmission in a subsequent time division.

In Aspect 16, the method of any of Aspects 11 to 15 includes transmitting, to the UE, a configuration indicating to refrain from transmitting at least the non-overlapping portion of the second uplink transmission after applying the TA.

In Aspect 17, the method of any of Aspects 11 to 16 includes processing the first uplink transmission and the third uplink transmission without processing the second uplink transmission.

Aspect 18 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 17.

Aspect 19 is an apparatus for wireless communication including means for performing any of the methods of Aspects 1 to 17.

Aspect 20 is a computer-readable medium including code executable by one or more processors for wireless communications, the code including code for performing any of the methods of Aspects 1 to 17.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
receive a timing adjustment (TA) command indicating to adjust timing for an uplink transmission in a time division;
adjust, based on the TA command, the timing for the uplink transmission in the time division; and
where the uplink transmission includes an overlapping portion that at least partially overlaps in time with a previous uplink transmission scheduled for transmission in a previous time division, due to the TA command, and a non-overlapping portion that does not at least partially overlap in time with the previous uplink transmission, refrain from transmitting the non-overlapping portion of the uplink transmission that is scheduled in the time division.

2. The apparatus of claim 1, wherein the one or more processors are further configured to execute the instructions to cause the apparatus to refrain from transmitting the overlapping portion of the uplink transmission.

3. The apparatus of claim 1, wherein the time division includes one of a subframe, a slot of multiple symbols, or a symbol.

4. The apparatus of claim 1, wherein the uplink transmission is one of a physical uplink control channel (PUCCH) transmission, a physical uplink shared channel (PUSCH) transmission, or a sounding reference signal (SRS).

5. The apparatus of claim 1, wherein the one or more processors are further configured to execute the instructions to cause the apparatus to reschedule at least the non-overlapping portion of the uplink transmission for transmission in a subsequent time division.

6. The apparatus of claim 5, wherein the one or more processors are configured to execute the instructions to cause the apparatus to reschedule at least the non-overlapping portion of the uplink transmission based at least in part on a type of the uplink transmission.

7. The apparatus of claim 5, wherein the one or more processors are configured to execute the instructions to cause the apparatus to reschedule at least the non-overlapping portion of the uplink transmission based at least in part on a quality of service (QoS) associated with the uplink transmission.

8. The apparatus of claim 1, wherein the one or more processors are configured to execute the instructions to cause the apparatus to refrain from transmitting at least the non-overlapping portion of the uplink transmission based at least in part on one or more signal metrics measured from one or more signals received from a base station.

9. The apparatus of claim 1, wherein the one or more processors are further configured to execute the instructions to cause the apparatus to receive, from a base station, a configuration indicating to refrain from transmitting at least the non-overlapping portion of the uplink transmission after applying a TA indicated by the TA command.

10. The apparatus of claim 1, wherein the one or more processors are further configured to execute the instructions to cause the apparatus to transmit, to a base station, an indication that at least the non-overlapping portion of the uplink transmission that is scheduled in the time division is not transmitted.

11. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
transmit a timing adjustment (TA) command indicating to adjust timing for an uplink transmission by a user equipment (UE) in a time division; and
receive, from the UE and based on applying the TA command, a first uplink transmission in a first time division and a third uplink transmission in a third time division without receiving a non-overlapping portion of a second uplink transmission in a second time division that precedes the third time division in time and at least partially overlaps the first time division in time.

12. The apparatus of claim 11, wherein the one or more processors are configured to execute the instructions to cause the apparatus to receive the first uplink transmission and the third uplink transmission without receiving an overlapping portion of the second uplink transmission that overlaps the first time division in time.

13. The apparatus of claim 11, wherein the first time division, the second time division, and the third time division include one of a subframe, a slot of multiple symbols, or a symbol.

14. The apparatus of claim 11, wherein the first uplink transmission, the second uplink transmission, and the third uplink transmission are one of a physical uplink control channel (PUCCH) transmission, a physical uplink shared channel (PUSCH) transmission, or a sounding reference signal (SRS).

15. The apparatus of claim 11, wherein the one or more processors are further configured to execute the instructions to cause the apparatus to receive, from the UE, an indication of a rescheduling of the non-overlapping portion of the second uplink transmission for transmission in a subsequent time division.

16. The apparatus of claim 11, wherein the one or more processors are further configured to execute the instructions to cause the apparatus to transmit, to the UE, a configuration indicating to refrain from transmitting at least the non-overlapping portion of the second uplink transmission after applying a TA indicated by the TA command.

17. The apparatus of claim 11, wherein the one or more processors are further configured to execute the instructions to cause the apparatus to process the first uplink transmission and the third uplink transmission without processing the second uplink transmission.

18. A method for wireless communications by a user equipment (UE), comprising:
receiving, by the UE, a timing adjustment (TA) command indicating to adjust timing for an uplink transmission in a time division;
adjusting, by the UE and based on the TA command, the timing for the uplink transmission in the time division; and
where the uplink transmission includes an overlapping portion that at least partially overlaps in time with a previous uplink transmission scheduled for transmission in a previous time division due to the TA command, and a non-overlapping portion that does not at least partially overlap in time with the previous uplink transmission, refraining from transmitting the non-overlapping portion of the uplink transmission that is scheduled in the time division.

19. The method of claim 18, further comprising refraining from transmitting the overlapping portion of the uplink transmission.

20. The method of claim 18, wherein the time division includes one of a subframe, a slot of multiple symbols, or a symbol.

21. The method of claim 18, wherein the uplink transmission is one of a physical uplink control channel (PUCCH) transmission, a physical uplink shared channel (PUSCH) transmission, or a sounding reference signal (SRS).

22. The method of claim 18, further comprising rescheduling at least the non-overlapping portion of the uplink transmission for transmission in a subsequent time division.

23. The method of claim 22, wherein rescheduling at least the non-overlapping portion of the uplink transmission is based at least in part on a type of the uplink transmission.

24. The method of claim 22, wherein rescheduling at least the non-overlapping portion of the uplink transmission is based at least in part on a quality of service (QoS) associated with the uplink transmission.

25. The method of claim 18, wherein refraining from transmitting at least the non-overlapping portion of the uplink transmission is based at least in part on one or more signal metrics measured from one or more signals received from a base station.

26. The method of claim 18, further comprising receiving, from a base station, a configuration indicating to refrain from transmitting at least the non-overlapping portion of the uplink transmission after applying a TA indicated by the TA command.

27. The method of claim 18, further comprising transmitting, to a base station, an indication that at least the non-overlapping portion of the uplink transmission that is scheduled in the time division is not transmitted.

28. A method for wireless communications by a base station, comprising:
   transmitting, by the base station, a timing adjustment (TA) command indicating to adjust timing for an uplink transmission, by a user equipment (UE), in a time division; and
   receiving, from the UE and based on applying the TA command, a first uplink transmission in a first time division and a third uplink transmission in a third time division without receiving a non-overlapping portion of a second uplink transmission in a second time division that precedes the third time division in time and at least partially overlaps the first time division in time.

29. The method of claim 28, wherein receiving the first uplink transmission and the third uplink transmission is also without receiving an overlapping portion of the second uplink transmission that overlaps the first time division in time.

30. The method of claim 28, wherein the first time division, the second time division, and the third time division include one of a subframe, a slot of multiple symbols, or a symbol.

* * * * *